United States Patent
Oosterling

(10) Patent No.: US 7,589,298 B2
(45) Date of Patent: Sep. 15, 2009

(54) ROLL-UP HEATING FOR A FLOOR, OR WALL

(75) Inventor: Robert Oosterling, Zevenaar (NL)

(73) Assignee: Devi A/S, Vejle (DK)

( * ) Notice: Subject to any disclaimer, the term of this patent is extended or adjusted under 35 U.S.C. 154(b) by 428 days.

(21) Appl. No.: 11/228,017

(22) Filed: Sep. 16, 2005

(65) Prior Publication Data

US 2006/0086717 A1    Apr. 27, 2006

Related U.S. Application Data

(60) Provisional application No. 60/616,409, filed on Oct. 7, 2004.

(30) Foreign Application Priority Data

Sep. 16, 2004    (NL) .................................. 1027053

(51) Int. Cl.
   *H05B 3/00*    (2006.01)
(52) U.S. Cl. ..................... 219/213; 219/528
(58) Field of Classification Search ............. 219/213, 219/203, 212, 238, 528, 545, 548, 549, 552
   See application file for complete search history.

(56) References Cited

U.S. PATENT DOCUMENTS

| 3,283,284 A | 11/1966 | Eisler |
| 3,510,547 A | 5/1970 | Eisler |
| 3,539,767 A | 11/1970 | Eisler |
| 3,544,762 A | 12/1970 | Eisler |
| 3,721,800 A | 3/1973 | Eisler |
| 4,115,917 A | 9/1978 | Charon et al. |
| 4,141,187 A | 2/1979 | Graves |
| 4,310,745 A * | 1/1982 | Bender ................... 219/213 |
| 4,967,057 A * | 10/1990 | Bayless et al. ............ 219/213 |
| 5,932,124 A | 8/1999 | Miller et al. |
| 5,942,140 A | 8/1999 | Miller et al. |
| 6,015,965 A | 1/2000 | Miller et al. |
| 6,087,630 A | 7/2000 | Miller et al. |
| 6,111,234 A * | 8/2000 | Batliwalla et al. ......... 219/549 |
| 6,124,571 A | 9/2000 | Miller et al. |
| 2002/0153368 A1 | 10/2002 | Gardner et al. |
| 2003/0199947 A1 | 10/2003 | Gardner et al. |

FOREIGN PATENT DOCUMENTS

GB    2061079 A   *  5/1981

* cited by examiner

*Primary Examiner*—Tu B Hoang
*Assistant Examiner*—Vinod D Patel
(74) *Attorney, Agent, or Firm*—Browdy and Neimark, P.L.L.C.

(57) ABSTRACT

The roll-up floor heating comprises an insulating layer, a heating element and a cladding. The insulating layer is intended for laying on a floor and the heating element extends between the cladding and the insulating layer. The cladding is intended to support a floor covering and comprises a force distribution layer for transmitting a force which is exerted on the cladding in a distributed manner to the insulating layer. In as far as (a part of) the heating element is at the location or in the vicinity of the exerted force, the load which will be exerted on it will be lower than the original load, due to the force being transmitted in a distributed manner. This lowers the risk of the heating element being damaged.

19 Claims, 2 Drawing Sheets

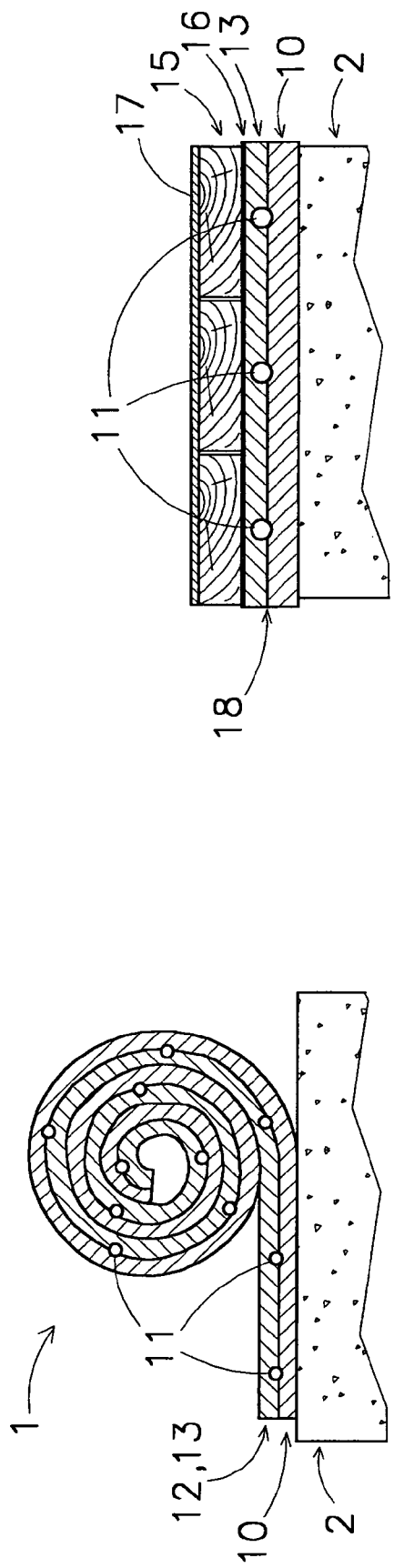
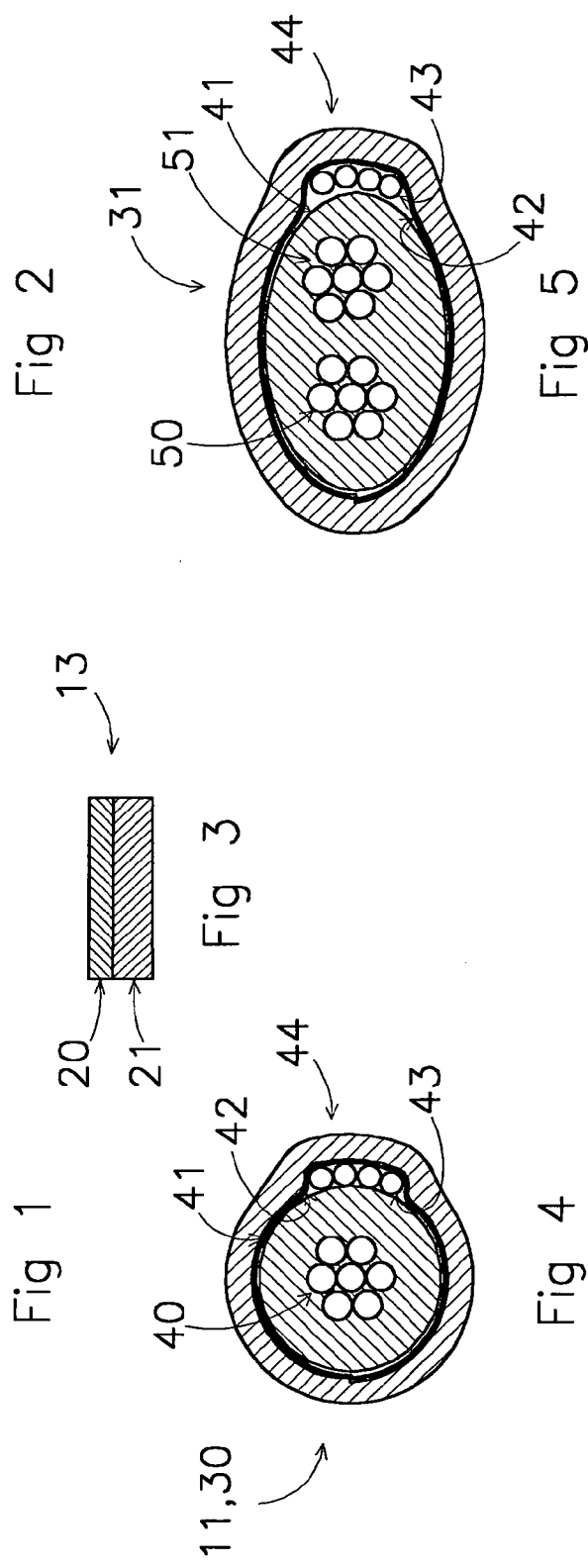
Fig 1
Fig 2
Fig 3
Fig 4
Fig 5

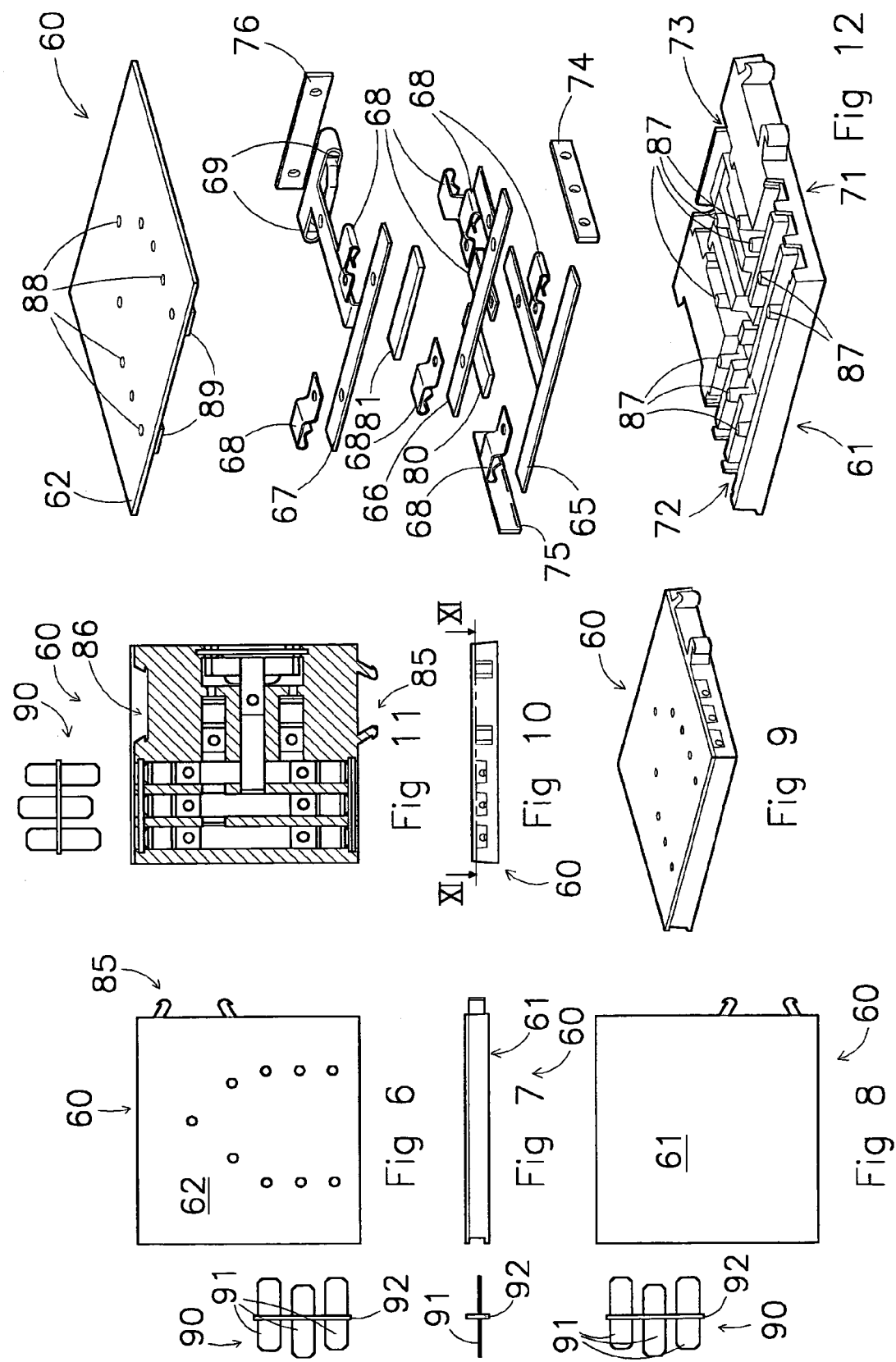

ROLL-UP HEATING FOR A FLOOR, OR WALL

CROSS-REFERENCE TO RELATED APPLICATIONS

This application claims priority from Netherlands Patent Application 1,027,053, filed Sep. 16, 2004, and of U.S. provisional application 60/616,409, filed Oct. 7, 2004, which is incorporated herein by reference.

FIELD OF THE INVENTION

The invention relates to a roll-up heating for a floor, or wall. U.S. Pat. No. 3,539,767, in FIG. 11, discloses a roll-up floor heating which is composed of a number of layers. A metal foil through which electricity can be conducted serves as the heating element. This metal foil is glued between an underlay and a thin paper covering layer by means of polyvinyl chloride glue. A floor heating of this type can be rolled up during or after manufacture and transported to the room where it can serve as floor heating once it has been unrolled.

BACKGROUND OF THE INVENTION

The known roll-up floor heating has the drawback that it is not readily suitable to be used directly under all types of floor coverings, since forces which are exerted on a floor covering and transmitted via this floor covering to the floor heating may lead to damage to the heating element.

It is an object of the invention to at least partially eliminate the abovementioned drawback or to at least provide a usable alternative.

In particular, it is an object of the invention to provide a heating for a floor, or wall, onto which several types of floor covering can be laid and in which the risk of a load on the respective floor covering leading to damage to the heating element is small.

SUMMARY OF THE INVENTION

The roll-up heating for a floor, or wall, comprises an insulating layer, a heating element and a cladding. The insulating layer is intended for laying on a floor and the heating element extends between the cladding and the insulating layer. The cladding is intended to support a floor covering and comprises a force distribution layer for transmitting a force which is exerted on the cladding in a distributed manner to the insulating layer.

In as far as (a part of) the heating element is at the location or in the vicinity of the exerted force, the load which will be exerted on it will be lower than the original load, due to the force being transmitted in a distributed manner. This lowers the risk of the heating element being damaged.

Preferred embodiments of the invention are defined in the subclaims.

In one embodiment, the force distribution layer has a lower modulus of elasticity on its side facing the insulating layer than on its other side, in particular at most 67% of the modulus of elasticity of the other side. In particular, the force distribution layer comprises a first and second sublayer. The second sublayer faces the insulating layer. The first sublayer has a higher modulus of elasticity than the second sublayer. As a result of the difference in the modulus of elasticity, a point load on the force distribution layer results in a pressure which is higher on the side remote from the insulating layer, in particular the first sublayer. This pressure is substantially in the plane of the force distribution layer and causes the top side of the force distribution layer to sink over a relatively large surface area. In this manner, a point load of this kind is absorbed over a relatively large surface area, resulting in the depression being smaller than with an equally thick force distribution layer without such a difference in the modulus of elasticity.

Expediently, the thickness of the force distribution layer is at least 2 mm. This enables the heating element to be at least partially incorporated into the force distribution layer without this leading to an annoying bulge on the top side of the cladding, which could lead to problems when laying certain types of floors. In addition, such a minimum thickness makes it possible to transmit a force in a distributed manner.

In one embodiment, the insulating layer comprises a plastic foam. Such a plastic foam offers good insulating properties and is also able to at least partially accommodate the heating element.

In one particular form, a heat-diffusing layer is provided between the cladding and the insulating layer. Such a heat-diffusing layer makes it possible to use heating elements at discrete distances, the heat-diffusing layer ensuring that the heat generated by these elements is diffused between the cladding and the insulating layer and can thus be given off to the environment in a more uniform manner.

Advantageously, the heating element comprises an electrical resistance cable. Such a resistance cable is per se less vulnerable than a resistance sheet, for example, but is at risk from being compressed too strongly when it is used in a roll-up heating for a floor, or wall. Due to the force distribution layer, this risk of compression is relatively small.

In particular, the electrical resistance cable follows a meandering path with an intermediate distance between the loops of substantially at most 6 cm. By arranging the loops forming the meandering path a relatively small distance apart, the heat is distributed evenly.

In one embodiment, the thickness of the force distribution layer is equal to at least half the diameter, in particular at least the entire diameter, more in particular at least twice the diameter, of the electrical resistance cable. This enables the electrical resistance cable to be at least partially accommodated in the force distribution layer. In addition, such a minimum thickness enables a force to be transmitted in a distributed manner.

Advantageously, the force distribution layer is compressible in such a manner that the electrical resistance cable is at least partially accommodated therein. This results in a load on the force distribution layer being transmitted to a lesser degree via the resistance cable than would be the case if the force distribution cable were less compressible.

In an advantageous embodiment, the electrical resistance cable comprises a first resistance wire, an electrically insulating sleeve extending around the first resistance wire and an earthing sheath extending around the insulating sleeve. The earthing sheath comprises an electrically conductive foil, in particular aluminium foil. A sheath made from a foil of this type is less expensive to produce than an earthing sheath made from braided copper wire.

In particular, the electrically conductive foil runs substantially parallel to the insulating sleeve and is folded around it. This also makes it possible to produce the earthing sheath in a simple manner.

In one variant, the electrically conductive foil is helically wound around the insulating sleeve in strip form. This makes it possible to produce the earthing sheath in a simple manner.

In one particular form, the earthing sheath furthermore comprises at least one earth wire which extends substantially parallel to the resistance cable. Such an earth wire contacts the aluminium foil and makes it possible to connect the earthing sheath at one end of the resistance wire to an external earthing means.

BRIEF DESCRIPTION OF THE DRAWINGS

One embodiment of the invention will be explained in more detail with reference to the attached drawing, in which:

FIG. 1 shows a roll-up floor heating according to the invention in a partially rolled up and partially unrolled state;

FIG. 2 shows a part of the unrolled roll-up floor heating with a wooden floor covering;

FIG. 3 shows a detail of a force distribution layer;

FIG. 4 shows a detailed view of an electrical resistance cable in section;

FIG. 5 shows a variant of the roll-up resistance cable;

FIG. 6 shows a top view of a socket;

FIG. 7 shows a side view of the socket from FIG. 6;

FIG. 8 shows a bottom view of the socket from FIG. 6;

FIG. 9 shows a perspective view of the socket from FIG. 6;

FIG. 10 shows a second side view of the socket from FIG. 6;

FIG. 11 shows a section on line XI-XI in FIG. 10;

FIG. 12 shows an exploded perspective view of the socket from FIG. 6.

DESCRIPTION OF A PREFERRED EMBODIMENT

FIG. 1 diagrammatically shows a roll-out floor heating according to the invention which is denoted overall by reference numeral 1. The roll-out floor heating 1 is still partially rolled up in FIG. 1 and partially unrolled onto a floor, in this case a concrete floor 2. The roll-up floor heating 1 comprises an insulating layer 10, a heating element 11 and a cladding 12. In this exemplary embodiment, the cladding 12 in its entirety also acts as a force distribution layer 13. A floor covering is provided on the force distribution layer 13, in this case consisting of a wooden or parquet floor 15. The wooden floor 15 is fixedly connected to the force distribution layer 13 by means of an adhesive layer 16. A finishing layer 17 is provided on the wooden floor 15, for example a lacquer coating. An aluminium foil 18 extends between the insulating layer 10 and the force distribution layer 13. There is no rigid intermediate layer, above the cladding 12. The wooden floor 15 is supported directly by the cladding 12, while the force distribution layer 13 protects the heating element 11 against loads on the wooden floor 15.

The force distribution layer 13 comprises a first and a second sublayer. The first sublayer 20 has a higher modulus of elasticity and a higher density than the second sublayer 21. The second sublayer 21 exhibits a greater compressibility than the first sublayer 20.

The force distribution layer 13 comprises a nonwoven material or felt. This material comprises non-woven fibres which are bonded to one another by a thermal or mechanical join. Both natural and synthetic fibres are eligible for use with this invention. Preferably, latex is used in the force distribution layer 13 as well. Rubber, either natural or synthetic, is preferably present in the first sublayer 20. In particular, the concentration rubber is higher at the outside of the first sublayer 20, i.e. at the upper side in use, of the force distribution layer 13, than at the side of the first sublayer 20 that is facing the second sublayer 21.

The first sublayer 20 is a nonwoven membrane having a higher material density and modulus of elasticity than the second sublayer 21. The first sublayer 20 is connected to the second sublayer 21, for example by means of a needled perforation or by being passed between two rollers. As the first sublayer 20 has a higher density, it can not only absorb tensile forces very well, but also forms a more or less continuous surface, which is advantageous when applying adhesive for gluing a floor covering. The force distribution layer 13 is elastic to such a degree that it can absorb the shrinkage and expansion of the wooden floor covering 15 glued onto the cladding 12.

The thickness of the force distribution layer 13 is substantially 6 mm, but preferably at least 2 mm, in particular at least 3 mm, more in particular at least 4 mm, and even more in particular at least 5 mm. The thickness of the first sublayer 20 is substantially at most equal to half the total thickness of the force distribution layer 13.

A force distribution layer 13 of such thickness, and compressibility, and in particular that of the second sublayer 21, partially accommodates the heating element 11 in such a manner that the cladding 12 is flatter at the top than is the case in the prior art. As a result, the roll-up floor heating 1 is better suited to different types of floors. The insulation layer 10 is also compressible, so that the heating element 11 is also partially accommodated in the insulating layer 10.

When a point load is exerted on the force distribution layer 13, this mainly results in a compression of the second sublayer 21 and the insulating layer 10. As a result of its higher modulus of elasticity, a tensile stress will occur in the first sublayer 20, substantially in the plane of the force distribution layer 13. This causes the first sublayer 20 to sink over a larger surface area than if its modulus of elasticity were lower, thus distributing the point load over a larger surface area.

The insulating layer 10 is made from a plastic foam, with a thermal conduction coefficient of substantially 0.2 W/(m.K). In addition, the insulating layer has good sound-absorbing properties. In particular, the insulating layer results in a noise reduction of at least 10 dB. The insulating layer 10 also has an equalizing function, as a result of which minor unevenness in the floor 2 is absorbed by the insulating layer 10. In addition, the insulating layer 10 is slightly resilient, thus making it more comfortable. The thickness of the insulating layer 10 is preferably at least 2 mm, in particular at least 3 mm, more in particular at least 4 mm, more in particular at least 5 mm and still more in particular at least 6 mm.

Due to the insulating action of the insulating layer 10, heat which is generated by the heating element 11 is prevented from dissipating into the floor 2. To this end, the insulation index of the insulating layer 10 is higher than that of the force distribution layer 13.

The insulating layer 10 can be connected to the floor 2 by means of an adhesive layer (not shown). Use of such an adhesive layer is optional. The adhesive layer used may be double-sided tape or gauze, which may be fitted while the roll-up floor heating is being produced, a permanent adhesive layer with protective film or a non-permanent adhesive layer. The advantage of a non-permanent adhesive layer is that this makes it possible to remove the roll-up floor heating after some time.

The aluminium film 18 ensures that the heat which is generated by the heating element 11 is diffused between the insulating layer 10 and the force distribution layer 13. In addition, the aluminium foil 18 causes any radiant heat which comes from above to be reflected upwards so that it does not penetrate further downwards, or at least does so to a lesser extent. That is the reason why the heating element 11 is situated on the foil 18. In addition, the aluminium foil 18 acts as a moisture barrier. The force distribution layer 13, the insulating layer 10 and the aluminium foil 18 are of such a thickness and elasticity that the entire roll-up floor heating 1 is sufficiently flexible to enable it to be rolled up. In particular, the entire roll-up floor heating 1 can be rolled up by hand to form a roll with an inner diameter of at most 15 cm. Preferably, this diameter is substantially 10 cm. A roll, comprising the roll-up heating for a floor or wall according to the present invention, can be transported, stored, and sold more conveniently than a flat heating with the same area.

In the exemplary embodiment of FIG. 2, the wooden floor 15 is glued to the roll-up floor heating 1 by means of the adhesive layer 16. Such a way of gluing a floor covering to the roll-up floor heating 1 can also be used in combination with floor tiles, linoleum or carpet. In addition, it is also possible to use loose-laid floor covering, such as laminate or plastic sheet flooring, or to attach the roll-up floor heating to a wall for use as a wall heating. In this case, it is advantageous that the insulating layer prevents the heat from dissipating to an adjacent room, while the force distribution layer protects the heating against horizontal loads on the relevant wall. When using floor tiles, it is important that the roll-up floor heating 1 is compressible only to such a degree that the floor tiles and the joints between the floor tiles do not move significantly with respect to one another in use.

One preferred embodiment of the heating element 11 is formed by an electrical resistance cable 30, as shown in section in FIG. 4. The diameter of the electrical resistance cable 30 is 1 to 2 mm. FIG. 5 shows an alternative electrical resistance cable 31.

The electrical resistance cable 30 comprises a single conductive inner core 40 (FIG. 4) made from one or more copper wires. The conductive core 40 is surrounded by an insulating layer 41, for example made from a plastic such as polyethylene. The insulation 41 is surrounded by an electrically conductive foil, in this case an aluminium foil 42. This foil 42 is folded around the insulation 41 in the form of a strip. Alternatively, it may be wound helically around the insulation 41. The aluminium foil 42 acts as an earthing means for the electrical resistance cable 30 and also acts as a screen against electromagnetic radiation. In addition to the aluminium foil 42, four tinned copper wires 43 are provided which extend in the longitudinal direction of the resistance cable 30. The wires 43 make electrical contact with the aluminium foil 42. One advantage of the wires 43 is the fact that they offer a simple connection to external earthing means.

The exterior of the resistance cable 30 is formed by a plastic covering sleeve 44. This plastic sleeve is made of LDPE (Low Density Polyethylene).

An aluminium earthing sheath 42 like that described above can also advantageously be used in an electrical resistance cable which is used for types of heating systems which differ from the roll-up floor heating described above with reference to FIGS. 1, 2 and 3.

FIG. 5 shows an alternative electrical resistance cable 31 with a double conductive core 50, 51. The other elements of the electrical resistance cable 31 are similar to the single resistance cable from FIG. 4 and are therefore denoted by the same reference numerals. Compared to a single-core electrical resistance cable, the electrical resistance cable 31 is able to produce more heat per unit length.

The aluminium earthing sheath 42 may also be used as a signal carrier, for applications where the roll-up heating 1 is provided with a separate electrical protection device. If the resistance cable 30, 31 is damaged, an electric voltage will occur in the earthing sheath/signal carrier 42. In a traditional system, the earthing sheath will conduct this electricity to earth. In contrast, the separate electrical protection device will detect the electricity in the signal carrier, and switch of the electricity supply to the roll-up heating 1.

The electrical resistance cable 30 is laid in a meandering path between the insulating layer 10 and the force distribution layer 13. The distance between the successive loops of the meandering path is preferably substantially 4 cm. Due to this intermediate distance, in combination with the aluminium heat diffusion layer 18, a homogeneous heat distribution is achieved. A larger intermediate distance, for example of substantially 6 cm, is likewise possible. If this is combined with a greater thermal conductivity of the heat diffusion layer 18, for example by using a thicker aluminium foil, a uniform heat distribution can be maintained.

A uniform heat distribution is also achieved by the thickness and heat-conveying properties of the force distribution layer 13. In this case, a certain degree of thermal insulation of the force distribution layer is advantageous, but this has to be less than that of the insulating layer 10.

The advantage of a resistance cable 30 over, for example a heat-generating foil, is that the former is less vulnerable. If the roll-up floor heating is locally severely dented or even perforated, this will be more likely to cause damage with a foil than with a resistance cable.

The invention also relates to a socket 60 (FIGS. 6-12). The socket 60 is intended to be incorporated in a floor heating, in particular the roll-up floor heating 1, for joining floor heating systems together and for coupling a floor heating to a mains supply. To this end, the socket 60 is provided near the edge of a floor heating, preferably near a corner.

The socket 60 comprises a plastic housing 61, a lid 62 and a plurality of electrically conductive connecting pieces, in particular connecting strips 65-67. These connecting strips 65-67 are substantially T-shaped, the strip 67 comprising an additional cross piece at its base. The first connecting strip 65 is the zero-strip, intended for electrically connecting the zero of an alternating current voltage. The second connecting strip 66 is intended for connecting the phase. The third connecting strip 67 is intended for electrically connecting earth. Incidentally, zero and phase may also be reversed and the socket is also suitable for direct current voltage, in which case the connecting strips 65 and 66 are intended for the negative and the positive poles, respectively.

Near their ends, the connecting strips are provided with a cable clip 68. Furthermore, the earthing strip 67 is provided with two sheath clips 69.

The housing 61 is furthermore provided with a first, second and third recess 71, 72 and 73, in this case a first, second and third accommodating groove. The accommodating grooves 71-73 are intended for accommodating rubber sealing strips 74, 75 and 76.

The first and second rubber sealing strips 74, 75 are of identical dimensions and can be accommodated both in the first and in the second accommodating groove 71, 72. The first sealing strip is provided with at least one, in this case three, round openings for sealingly accommodating a sheath of a round power cable. The second sealing strip is provided with substantially flat openings for sealingly leading through an electrical coupling piece which will be described in more detail below. The third sealing strip 76 is provided with two substantially round openings for leading through two ends of electrical resistance cables, in particular the two ends of the resistance cable 30. The rubber sealing strips 74, 75 and 76 thus ensure a water- and vapour-tight lead-through for electrical connections.

Furthermore, the socket 60 comprises a first and a second insulating strip 80, 81 made of an electrically insulating material, for example plastic.

The socket 60 can be coupled to a second socket, for electrically coupling at least two electrical floor heating systems. The housing 61 is provided with complementary first and second coupling means 85, 86. The first coupling means 85 comprise at least one, preferably two, projections, preferably provided with a barb. The second coupling means 86 are formed by a recess in the housing 61 and are designed to interlock with the at least one barbed projection. The complementary coupling means 85 and 86 are intended for coupling to a socket 60 which is inside an adjoining roll-up floor heating 1. In addition to the coupling means 85, 86 shown on one side of the recesses 71, 72, it may be advantageous to include coupling means on both sides of the recesses 71, 72.

In this manner, these recesses are pressed together in a more balanced manner when two sockets 60 are coupled together.

In order to couple the two sockets 60, the invention provides for an electrical coupling piece 90, in this case a multiple electrical coupling piece, in particular a three-way electrical coupling piece. The three-way electrical coupling piece 90 comprises three current feed-through elements 91, in this case formed by metal strips having chamfered corners. The current feed-through elements are mechanically connected to one another by an insulating connecting bridge 92. The connecting bridge 92 is made from a sealing material, such as rubber or a flexible plastic, and also serves as a seal for sealing the socket 60, together with the second sealing strip 75, in a watertight and vapour-tight manner.

The socket 60 is furthermore provided with coupling and positioning pins 87. In this case, the pins 87 are provided on the housing, whereas the lid 62 is provided with complementary spaces 88 in the shape of through-openings. The lid 62 is furthermore provided with pressure elements 89 at the location of the spaces 88. Both the connecting strips 65-67 and the cable clips 68 are provided with openings which are complementary to the pins 87.

As can best be seen in FIG. 12, the socket 60 is assembled by sliding the first connecting strip 65 with its openings over the corresponding pins 87. An insulating strip 80 is placed on top and subsequently the second strip 66 is slid over the corresponding pins 87, followed by insulating strip 81. Then, the third connecting strip 67 follows which is also pushed onto the pins 87. Finally, several, in this case eight, cable clips 68 are provided on the pins 87, following which sealing strips 74 and/or 75 are provided in the accommodating grooves 71 and 72, and a sealing strip 76 in accommodating groove 73. By using a sealing strip with round openings 74, the relevant side of the socket 60 is made suitable for the use of single lead-through cables (not shown). These lead-through cables (not shown) may run through a heating mat and connect the socket 60 to a second socket, preferably an identical second socket 60. Using a sealing strip with flat openings 75 makes it possible to couple the relevant side of the socket 60 directly to a socket in an adjoining floor heating mat using the three-way electrical coupling piece 90.

Finally, the lid 62 is fitted, during which procedure the pins 87 drop into the openings 88, thereby pressing the pressure elements 89 onto the cable clips 68, resulting in these contacting the corresponding connecting strips 65-67 in an electrically conductive manner. The lid 62 is sealingly connected to the raised edge and the pins 87 of the housing 61 by means of heat-sealing and/or gluing.

Both the beginning and the end of a heating cable, preferably the electrical resistance cable 30, are pushed through the openings in the sealing strip 76. In this case, the earthing sheath 42 conductively contacts the sheath clip 69. One or more core wires 40 protrude from the insulating layer 41 of the electrical resistance cable 30 and are accommodated in a clamping manner by a corresponding cable clip 68.

The housing 61 is so flat, this it can be accommodated in roll-up floor heating 1. In particular, it can be accommodated in the insulating layer 10, for example by locally creating a recess in the insulating layer 10.

In addition to the preferred embodiment shown and described, many variants are possible within the scope of the invention. Thus, the insulating layer may be made from a variety of different materials, such as foamed polymers and other plastics, cork, pressed or glued fibres, and grades of paper, such as cardboard. Advantageously, the insulating layer may also be provided with air chambers in order to increase the insulation index in a lightweight manner. What is relevant is that the insulation index is higher than that of the cover, with the proviso that it is possible to use a lower insulation index if the floor itself is already sufficiently insulated. In general, a thermal conduction coefficient of substantially 0.2 W (m.K) suffices. In addition, it is very important that the material of the insulating layer is sufficiently flexible to keep the roll-out heating for a floor, or wall, capable of being rolled up. When using finishes such as carpet, laminate, parquet, tiles, linoleum and the like, it is important that no forces, such as expansion and shrinkage, start to work in the insulating layer.

The heat diffusion layer can be omitted, especially if the distance between the loops of the resistance cable is small, or a heat-producing foil is used instead of a resistance cable. Even in those cases, a heat-diffusing foil may be advantageous, for example in order to reflect the heat which has developed upwards and to act as a moisture barrier. Materials which possess good thermal conduction properties are suitable as an alternative to the aluminium foil. It is also possible to create a heat diffusion layer by compressing the top of the insulating layer, for example by heating or pressing, or by providing a separate closing layer on top of the insulating layer. In these cases, therefore, the heat-diffusing layer forms part of the insulating layer.

The electrical resistance cable may be laid along alternative paths, for example paths with a greater or smaller intermediate distance than 4 cm. The advantage of using a smaller distance than 4 cm is that it may be possible to omit the use of an aluminium heat-diffusing layer. By contrast, a greater intermediate distance is less expensive, but offers a less uniform generation of heat.

It is possible to use heat foils, for example based on carbon or a (metal) alloy, instead of a resistance cable.

When using a resistance cable, an alternative electrically conductive foil may be used as earthing sheath, such as an electrically conductive plastic, or a metal foil. A conventional resistance cable with a braided earthing screen can also be used.

Instead of polyethylene, it is also possible to use teflon FEP (Fluorinated Ethylene Propylene), HDPE (High Density Polyethylene), LDPE (Low Density Polyethylene), PVC (Polyvinyl Chloride) or PET (Polyethylene) as insulation for the core of the resistance cable. The core of the resistance cable may be made from chromium nickel and various other resistance alloys instead of from copper.

Various alternatives are possible with respect to the force distribution layer. Thus, the first and second sublayer may differ from one another not only regarding density, but also regarding composition. The sublayers may also gradually merge in such a manner that no clear boundaries are visible. It is even possible to dispense completely with the use of sublayers, particularly with relatively thick force distribution layers. Alternative materials for the force distribution layer are rubber, both in vulcanized and granulated form, various plastics, such as polymer or polyurethane, grades of pressed paper and biologically degradable types.

The insulating layer and the force distribution layer can be but do not have to be connected by means of a connecting means, such as adhesive. If an adhesive is used, a polymer adhesive or hot-melt adhesive may be used. Alternatively, instead of adhesives, thermal welding may be used. It is also possible to construct the insulating layer and the force distribution layer as a single piece, for example in the form of a plastic foam, the density of which varies and in which recesses are provided for accommodating a heating element.

The socket may also be composed of fewer parts, by producing some of the components illustrated in one piece. Alternative materials to plastic, such as metal, may be used. The current feed-through elements do not have to be rectangular in section, but may, for example, also be round. A current feed-through element may also be fixedly, optionally removably, connected to a socket, or a flexible current feed-through element, for example in the form of a coupling cable, may be provided.

Thus, the invention provides a roll-up heating for a floor, or wall, which can be rolled up due to the flexibility of the materials used, thus making it easy to produce, transport and subsequently lay the heating for a floor, or wall. Due to the force distribution layer, various types of covering floors can be used, it being possible to use an electrical resistance cable between the force distribution layer and the insulating layer with a low risk of damage to the resistance cable. The electrical resistance cable according to the invention can be produced in a simple and inexpensive manner by using aluminium foil as earthing sheath.

What is claimed is:

1. Roll-up heating for a floor, or wall, comprising
   an insulating layer, a heating element and a cladding, in which the insulating layer is adapted for laying on a floor and the heating element extends between the cladding and the insulating layer,
   wherein the cladding is adapted to support a floor covering and comprises a force distribution layer for transmitting a force which is exerted on the cladding in a distributed manner to the insulating layer,
   and wherein the force distribution layer comprises a first and a second sub-layer, in which the first sub-layer has a higher modulus of elasticity than the second sub-layer and the second sub-layer faces the insulating layer.

2. Roll-up heating for a floor, or wall, according to claim 1, in which the thickness of the force distribution layer is at least 2 mm.

3. Roll-up heating for a floor, or wall, according to claim 1, in which the insulating layer comprises a plastic foam.

4. Roll-up heating for a floor, or wall, according to claim 1, in which a heat-diffusing layer is provided between the cladding and the insulating layer.

5. Roll-up heating for a floor, or wall, according to claim 1, in which the heating element comprises an electrical resistance cable, which comprises a first resistance wire.

6. Roll-up heating for a floor, or wall, according to claim 5, in which the electrical resistance cable follows a meandering looping path with a distance between the loops at most 6 cm.

7. Roll-up heating for a floor, or wall, according to claim 5, in which the thickness of the force distribution layer is equal to at least half the diameter of the electrical resistance cable.

8. Roll-up heating for a floor, or wall, according to claim 5, in which the force distribution layer is compressible in such a manner that the electrical resistance cable is at least partially accommodated therein.

9. Roll-up heating for a floor, or wall, comprising
   an insulating layer, a heating element and a cladding,
   in which the insulating layer is adapted for laying on a floor and the heating element extends between the cladding and the insulating layer,
   the cladding is adapted to support a floor covering, and the cladding comprises a force distribution layer for transmitting a force which is exerted on the cladding in a distributed manner to the insulating layer,
   and wherein the force distribution layer comprises a first and a second sub-layer, in which the first sub-layer has a higher modulus of elasticity than the second sub-layer and the second sub-layer faces the insulating layer,
   the heating element comprises an electrical resistance cable, which comprises a first resistance wire,
   wherein the electrical resistance cable furthermore comprises an electrically insulating sleeve extending around the first resistance wire and an earthing sheath extending around the insulating sleeve, the earthing sheath comprising an electrically conductive foil.

10. Roll-up heating for a floor, or wall, according to claim 9, in which the electrically conductive foil runs substantially parallel to the insulating sleeve and is folded around it.

11. Roll-up heating for a floor, or wall, according to claim 9, in which the electrically conductive foil is helically wound around the insulating sleeve in strip form.

12. Roll-up heating for a floor, or wall, according to claim 1, in which the insulating layer comprises a sound-absorbing material which results in a noise reduction of at least 10 dB.

13. Roll-up heating for a floor, or wall, according to claim 1, in which the compressibility of the roll-up floor heating is low and wherein the floor covering comprises floor tiles.

14. Roll-up heating for a floor, or wall, according to claim 1, wherein the floor covering comprises a wooden floor glued onto the cladding and wherein the force distribution layer is elastic to absorb the shrinkage and expansion of the wooden floor.

15. Roll-up heating for a floor, or wall, according to claim 1, provided with a socket for interconnecting multiple strips of heating for a floor, or wall, or connecting the roll-up heating for a floor, or wall to an electric power supply.

16. Roll-up heating for a floor, or wall, according to claim 7, in which the thickness of the force distribution layer is equal to at least the entire diameter of the electrical resistance cable.

17. Roll-up heating for a floor, or wall, according to claim 5, in which the thickness of the force distribution layer is equal to at least twice the diameter of the electrical resistance cable.

18. Roll-up heating for a floor, or wall, according to claim 9, wherein the electrically conductive foil is aluminum foil.

19. Roll-up heating for a floor, or wall, comprising
   an insulating layer, a heating element and a cladding,
   in which the insulating layer is adapted for laying on a floor and the heating element extends between the cladding and the insulating layer,
   wherein the cladding is adapted to support a floor covering, and wherein the cladding comprises a force distribution layer for transmitting a force which is exerted on the cladding in a distributed manner to the insulating layer;
   wherein the force distribution layer comprises a first and a second sub-layer, in which the first sub-layer has a higher modulus of elasticity than the second sub-layer and the second sub-layer faces the insulating layer;
   wherein the thickness of the force distribution layer is at least 2 mm;
   wherein the heating element comprises an electrical resistance cable, which comprises a first resistance wire; and
   wherein the electrical resistance cable follows a meandering looping path with distance between the loops at most 6 cm.

* * * * *